Sept. 7, 1926.
J. G. FAY
1,599,123
CHANGE SPEED APPARATUS
Filed April 27, 1922
2 Sheets-Sheet 2
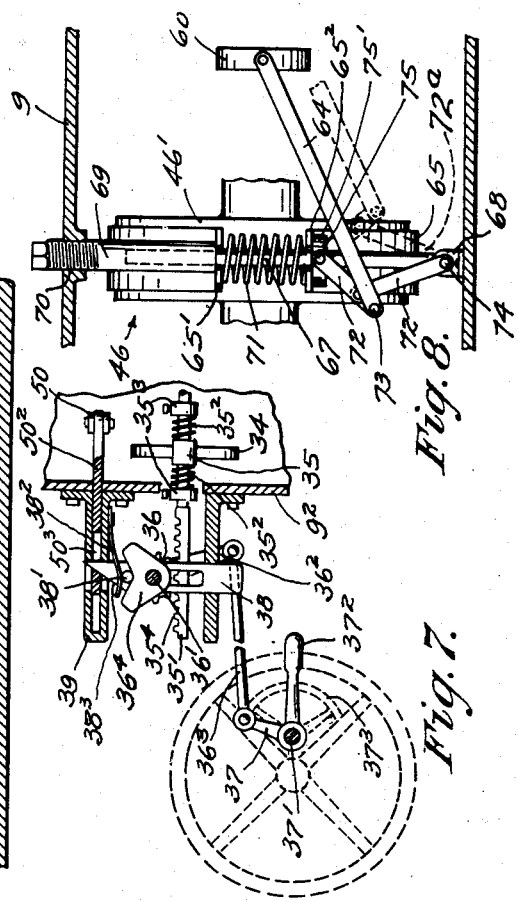
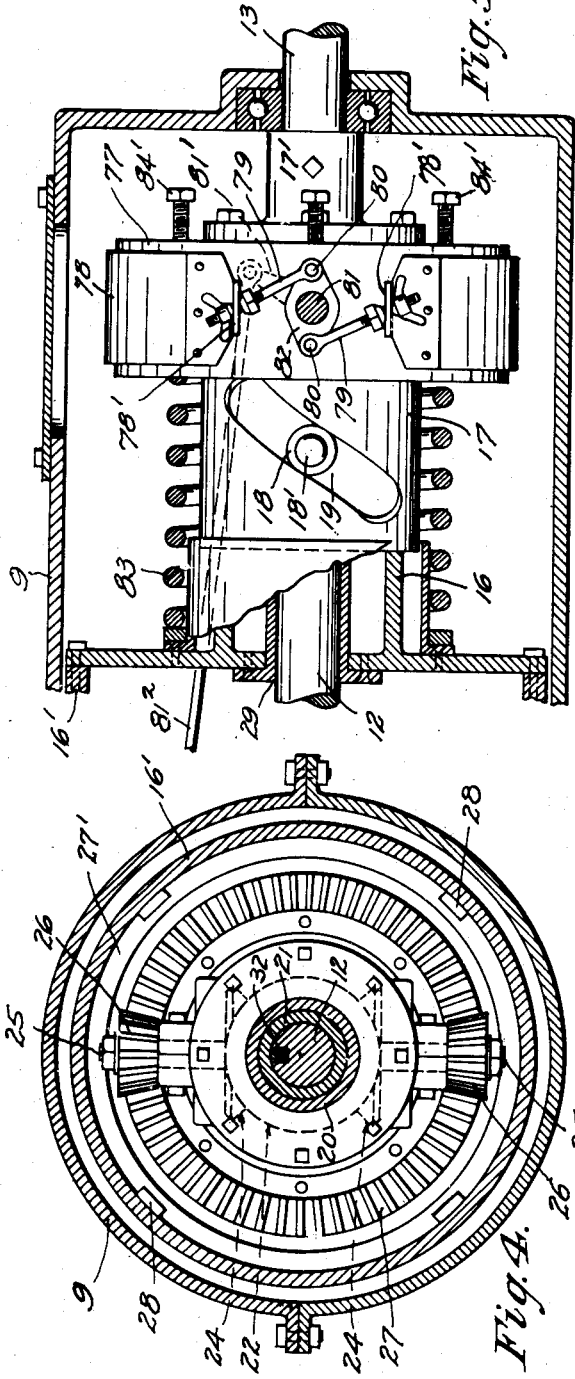
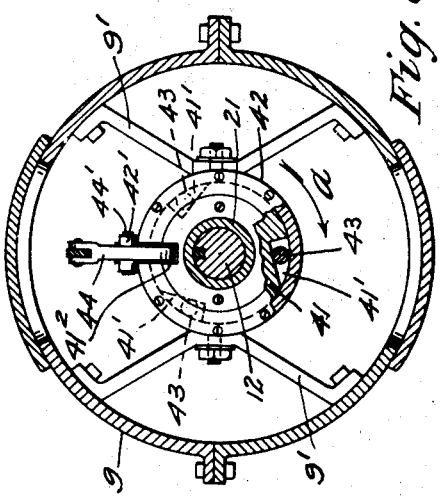
INVENTOR
Joseph G. Fay
BY
Pierre Barnes
ATTORNEY Patented Sept. 7, 1926.

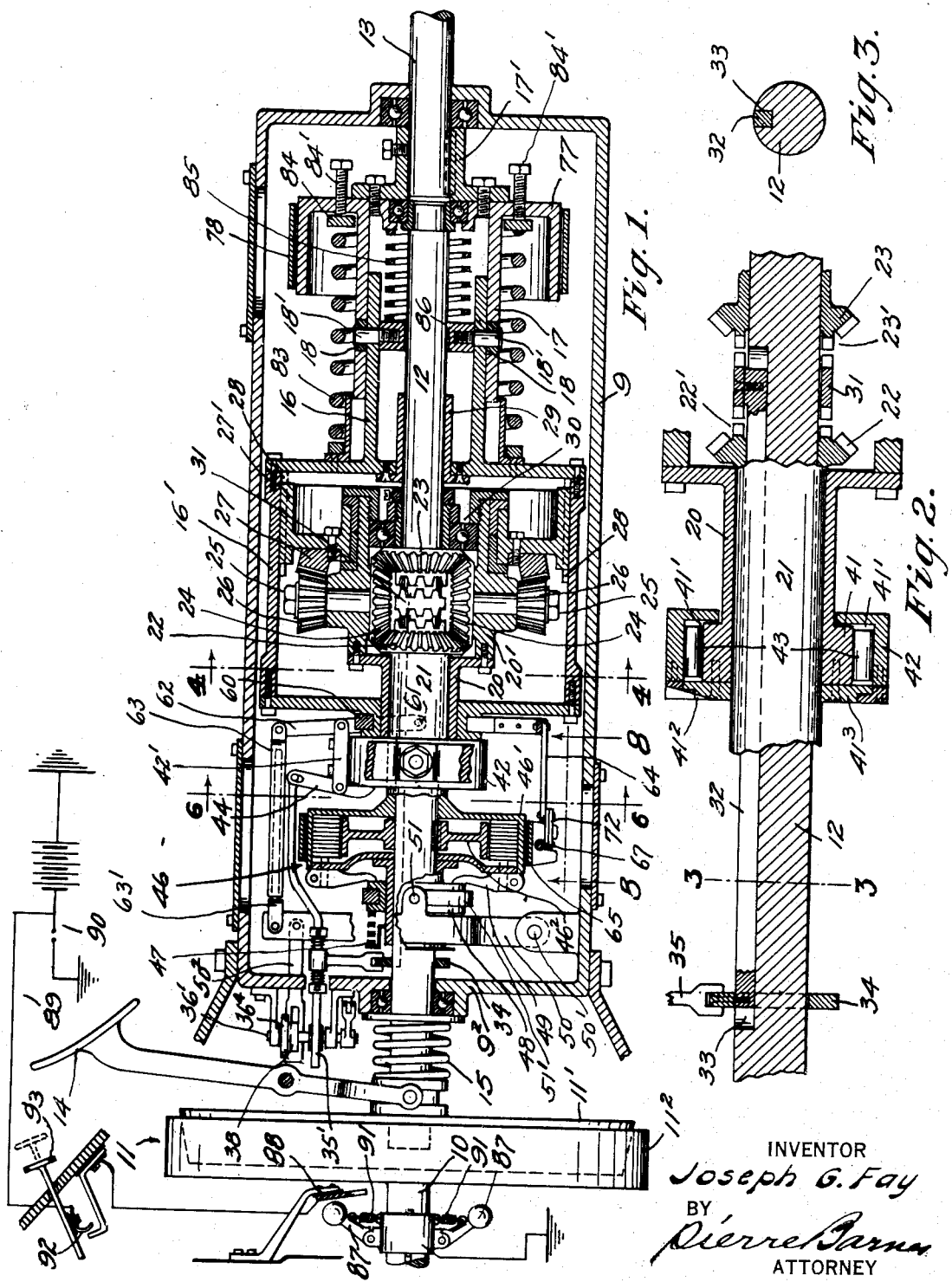

1,599,123

UNITED STATES PATENT OFFICE.

JOSEPH G. FAY, OF SEATTLE, WASHINGTON.

CHANGE-SPEED APPARATUS.

Application filed April 27, 1922. Serial No. 556,875.

This invention relates to variable-speed gearing for use, more especially, upon motor-vehicles for transmitting motion from a member having a substantially uniform speed to a driven member at a speed responsive to the torque load thereon.

The primary object of the invention is the provision of improved apparatus whereby the above referred to effect may be produced by automatically controlled devices.

Another object of the invention is the provision of apparatus to accomplish such effects either automatically or manually at the selection of the operator.

Still further objects and advantages of the invention will be disclosed in the following specification.

The invention consists in the novel construction, arrangement and combination of parts hereinafter described with reference to the accompanying drawings, in which,—

Figure 1 is a side elevational view with parts in vertical section and electrical devices illustrated diagrammatically of devices embodying my invention. Fig. 2 is a longitudinal sectional view of a portion of the power transmission shaft and certain associated parts shown in Fig. 1. Fig. 3 is a transverse section through 3—3 of Fig. 2. Fig. 4 is a sectional view through 4—4 of Fig. 1. Fig. 5 is a view in section and elevation of the right hand portion of Fig. 1 to illustrate the load responsive coupling devices and the associated brake. Fig. 6 is a sectional view taken substantially through 6—6 of Fig. 1. Fig. 7 is a detail plan view of the transmission regulating devices, the controlling devices therefor being illustrated in connection with a steering post which is indicated by dotted lines. Fig. 8 is an underside plan view from plane 8—8 of Fig. 1 and showing the housing in horizontal section.

In said drawings, the reference numeral 10 represents a driving shaft by which power is transmitted through an intermediate shaft 12 to a driven shaft 13. These shafts, as illustrated, are disposed in axial alignment with each other.

The driving shaft 10 is operatively connected with the intermediate shaft 12 by means of a clutch 11 and, in effect, constitutes an extension of the shaft 10. 14 represents a pedal lever acting in opposition to a spring 15 for disengaging the shiftable member $11^1$ of said clutch from its complementary member $11^2$.

Similar to the devices illustrated my prior Patent #1,428,326 granted September 5th, 1922, upon change-speed gearing, the present invention includes two telescopically arranged cylinders 16 and 17, which are operatively connected with each other by means of rollers 18 rotatable on studs $18^1$ secured to the cylinder 16 at diametrically opposite sides and acting in helical slots 19 provided in the cylinder 17.

The cylinder 17 is secured as by means of a hub $17^1$ rigid therewith to the driven shaft 13.

The cylinder 16 extends from and forms part of a cylindrical drum $16^1$ which is journaled upon a sleeve 20 which, in turn, is journaled on a second sleeve 21 which is mounted upon the shaft 12.

The drum $16^1$ serves as a housing for a system of toothed planetary gearing comprising a bevel gear 22 rigid with the sleeve 21, a bevel gear 23 which is rotatable upon the shaft 12 with intermediate bevel gears 24 in mesh with both of the gears 22 and 23 as shown in Fig. 1. The gears 24 are respectively mounted upon stub shafts 25 disposed radially of the shaft 12 and are journaled in bearings provided in a circular extension $20^1$ of the sleeve 20.

Exteriorly of the extension $20^1$, said stub shafts have mounted thereon bevel pinions 26 which mesh in a ring gear 27 which is formed integral with or rigidly secured to a circular frame $27^1$ which is journaled on the sleeve-extension $20^1$ and is connected with the drum $16^1$ to rotate therewith as by means of splines 28.

Bearings for the drum $16^1$ and the extension $20^1$ are desirably provided as at 29 and 30, respectively.

The gears 22 and 23 are provided with serrated clutch elements $22^1$ and $23^1$, Fig. 2, engageable by opposite teeth of a correspondingly serrated clutch member 31. This clutch member is in the nature of a collar mounted upon the shaft 12 and is movable axially of the shaft into engagement with either of the clutch elements $22^1$ and $23^1$ selectively, as by means of an operating rod 32, see Figs. 2 and 3, positioned in a longitudinal way 33 provided in the shaft. The rod 32 is secured to the clutch member 31 and serves as a spline therefor to cause the member to rotate positively with the shaft and when brought into engaged relations with either of the complementary clutch elements 22¹ or 23¹ serves to couple the respective gears 22 or 23 with the shaft.

Secured to the rod end remote from the clutch member 31 is a ring 34 which rotates between the tines of a reciprocatory forked arm 35 which, as shown in Figs. 1 and 7, is slidable axially on a shifter bar 35¹. This bar extends through the end wall 9² of casing 9, and in front of the latter the bar is provided with rack teeth 35⁴, Fig. 7, engageable with the teeth of a spur pinion 36 which is rigidly mounted on a vertical spindle 36¹. An arm 36² provided on said spindle is operatively connected by means of a reach rod 36³ with an arm 37 provided at the lower end of a shaft 37¹ having at its upper end a handle arm 37². The handle arm 37² is located within convenient reach of the operator from the driver's seat and is engageable in spaced in notches of a sector piece 37³, shown by dotted lines in Fig. 7, for positioning said handle arm to manually regulate the speed changing mechanism as will be described hereinafter.

Secured to the spindle 36¹ is a cam 36⁴ having in its periphery a recess between two protuberant portions. This cam acting against a stud 38¹ provided on a wedge block 38 serves to urge the same laterally in opposition to a retractile spring 38², said wedge block extending through a slot 50³ provided in a bar 50² which is connected to and extends forwardly from a lever 50. As shown in Fig. 7, the block 38 is guided in slots provided in the walls of a guide 39 for the bar 50².

Said block is provided with a face 38³ which is inclined from the direction of travel of the block, said inclined face acts against an end of the slot 50³ serves to push the bar 50² forward whereby the lever 50 is influenced to correspondingly move the controlling collar 48 for the clutch 46.

The sleeve 20 is rigid with a wheel 41, Fig. 2, which is normally rotatable in the direction denoted by arrow $a$ in Fig. 6 within the bore of a cylindrical casing 42 which is rigidly connected as by means of struts 9¹ to a casing 9. The wheel 41 is prevented from rotating in the opposite direction from said arrow by means of balls or rollers 43 provided in triangular recesses 41¹ disposed in the periphery of said wheel. The wheel may, however, be positively locked against any rotary motion by means of a dog 44 fulcrumed at 44¹ to a block 42¹ which is secured to or formed integral with the casing 42. Said dog being arranged to engage in a recess such as 41² provided in the end element 41³ of said wheel. The dog is brought into engaged relations with said wheel when the clutch member 31 is brought into engaging relations with the clutch element 22¹ when the reverse rotation of the shaft 13 is to be effected. To such ends the dog is connected to the bar 35¹ which is employed to shift the clutch controlling rod 32.

Included in the invention is another clutch, preferably of the disc type, which is denoted generally by 46 in Fig. 1, whose office is to releasably couple the gear 22 directly with the intermediate shaft 12. This clutch has a shell member 46¹ rigid with the aforesaid sleeve 21 which is rigid with the gear 22.

The internal spider member 46² of clutch 46 is keyed or otherwise secured to the shaft 12. The clutch discs of the respective members 46¹ and 46² are yieldingly held in coupled relations with each other by means of an extensible spring 47 urging a collar 48 against actuating lever element 49 of the clutch. To disengage the clutch, the collar 48 is moved in opposition to the spring 47 through the medium of the aforesaid lever 50 which is fulcrumed at 50¹ and is connected by apertured ears with trunnions 51 provided on a ring 51¹ which is positioned in a peripheral groove of the collar 48.

The lever 50 is adapted to be actuated either automatically or manually to effect the disengagement of the complementary parts of clutch 46. For automatic control of the clutch 46, the axially movable drum 16¹ carries therewith a yoke 60 which is pivotally connected at 61 with a lever 62 which is fulcrumed to the block 42¹ and is connected to a tubular rod 63, into which extends a rod 63¹ which is connected to the lever 50.

The rod 63¹ is adapted to abut against a stop at the inner end of the bore of the rod 63 so that when the drum 16¹ approaches the end of its rear travel it will act through the rod 63¹ to cause the lever 50 to be influenced to effect the disengagement of the disc elements of the clutch 46. When the clutch discs are thus disengaged, the clutch shell 46¹ is held against rotation by means of brake devices which are regulated from the aforesaid yoke 60 through the medium of a connecting rod 64. As shown in Figs. 1 and 8, said brake devices consist of a brake band 65 extending about the shell 46¹ and having under the latter, as shown in Fig. 8, downwardly extending slotted end portions 65¹ and 65². Extending through the slots of said band portions is a horizontal rod 67 which is supported from one end to a bracket attachment 68 of the casing 9 and has its other end socket in a hollow screw bar 69 which extends through and engages in a threaded hole 70 provided in the casing 9. A spring 71 surrounding the rod 67 between said end portions of the brake band tends to yieldingly retain the brake band in its most open or disengaged relations with respect to the shell 46¹.

For closing the brake band into engageable relations with the shell, I employ a pair of toggle elements 72 connected at 73 to the aforesaid connecting rod 64 and between pivot connections 74 and 75 respectively provided upon the bracket attachment 68 and a thrust collar 75¹ provided on the rod 67 in juxtaposition with the band part 65².

When the toggle is extended the thrust collar 75¹ cooperates with the end of the bar 69 to cause the brake band to operatively embrace said shell member. The toggle links, moreover, are arranged to cause the brake band to act when the toggle elements are in approximately aligned positions with each other and to become inoperative—that is, release the brake—when the toggle elements are brought into approximately the positions in which they are represented by full and dotted lines, respectively, in Fig. 8 and responsive to the axial movements of the drum 16¹ with the cylinder 16.

By means of a tool applied to the outer end of the screw bar 69 the same may be advanced or retracted to correspondingly regulate the effective action of the toggle.

77 represents a drum rigid with the cylinder 17 and cooperates with a band 78 to serve as a brake for the transmission shaft 13.

As shown in Fig. 5, the brake band 78 is operated by means of links 79 connecting the band ends 78¹ with crank pins 80 provided on the head 82 of a rocker shaft 81 which may be controlled through the medium of a crank arm denoted by dotted lines 81¹, and a connecting rod 81² (Fig. 5) from a pedal or other suitable operating means, not shown, located adjacent to the driver of the vehicle to which the invention is applied.

83 represents a helical spring interposed between the drum 16¹ and a ring 84 bearing against adjusting screws 84¹ extending through an end of the drum 77 which is integral with the cylinder 17.

This spring tends to resiliently retain the cylinder 16 at its most forward position with respect to the cylinder 17.

85 represents a second helical spring one end of which, like the spring 83, bears against the drum end and its other end bears against an internal abutment of the cylinder 16 as, for example, a ring 86 rigid with the cylinder.

As shown, the studs 18¹ serve to secure said ring to the cylinder.

The spring 85 is of less length than the spring 83 and acts only while the cylinder 16 is brought into the position which it occupies when the change speed gearing are in their low and second speed relations with each other.

Included in the invention are devices which serve to prevent the engine being "killed"—as when starting with a "cold" engine or in ascending a long incline when occurs a "balance", so-called, between the engine power and the torque load. For which purpose I provide a means for governing the action of the engine ignition system so as to temporarily interrupt the fuel explosions and upon the resumption of such explosions afford an increase of the power, in the striking force thereof, to facilitate a shift to a lower-speed gear. This device operates, it is to be understood, only when the engine is laboring with a wide open throttle and the R. P. M. of the engine has dropped to a predetermined point.

To such end, I provide upon the engine shaft 10, Fig. 1, a governor having weighted arms 87 which, upon being revolved at or about the normal speed of the engine, travel in an orbital path out of contact with a relatively stationary segment 88 which constitutes a terminal of a branch electrical circuit 89 from the ignition system 90 of the associated engine. 91 represent springs which serve when the engine speed decreases sufficiently to effect the contact of one of the arms 87 with the aforesaid segment to temporarily close the circuit opening therebetween.

The branch circuit 89 is provided with a gap for which is a switch having its movable element 92 carried preferably by a pedal 93, known as the "accelerator" which is employed for regulating the fuel feed of the engine to increase its power at the selection of the operator.

As mentioned above, the ignition control is capable of acting only when the engine speed is diminishing, which allows the springs 91 to assert themselves to bring the arms 87 successively into contact with the segment 88 thereby enabling the ignition circuit to be shorted, the operator having previously thereto closed the branch-circuit switch by depressing the pedal 93 for the purpose of supplying fuel to the engine.

The operation of the invention as applied to driving a vehicle is as follows:

Assuming the clutch member 31 is in the neutral position in which it is represented in Fig. 1 and that the driving shaft 12 and the clutch member 46² are rotated with the engine shaft 10, the clutch 11 being engaged. Under such an arrangement the shaft 12 rotates independently of the transmission gears 22 and 23 and imparts no rotary motion to the shaft 13 which is operatively connected to the traction wheels of a vehicle.

To start the vehicle, the clutch 11 is first disengaged and the operator by means of handle 37² influences the shifting bar 35¹ to effect endwise movement to the bar 32 to correspondingly move the clutch member 31 into engagement with one or the other of the clutch members $22^1$ or $23^1$, respectively, according to whether the vehicle is to be propelled in a rearward or forward direction.

When the vehicle is to be driven forwardly the clutch members 31 and $23^1$ serve to couple the gear 23 to the shaft 12, and the clutch 46 serves to couple the gear 22 to the shaft 12.

The operator then allows the spring 15 to effect the engagement of the clutch 11 to cause the shaft 12 to become operative.

With the shaft 12 thus rotated and with the two gears 22 and 23 engaged therewith the latter are rotated to effect the rotation of the drum $16^1$ and the cylinder 16 at the same speed as the engine shaft 10. The inertia of the vehicle in starting, however, being greater than can be overcome by the power of the engine as transmitted at engine speed through the cylinder 16, is incapable of rotating the shaft 13 at such speed through the medium of the cylinders 16 and 17.

Said cylinders are coupled for relative axial movements with respect to each other by means of the roller and pin attachments 18 and $18^1$ of the shiftable cylinder 16 acting in the helical slots 19 of the cylinder 17 in opposition to the springs 83 and 85 which tend to yieldingly retain the cylinders in their relatively extended positions.

The associated cylinders and springs 83 and 85, in conjunction with the ignition-regulating devices hereinbefore described, constitute the governing mechanism of the present invention. Such governing cylinder organization contracts under torsional loads greater than the power of the engine is capable of operating by a direct drive. Being thus influenced the cylinder 16 moves the drum $16^1$ rearwardly thereby causing the yoke 60 to affect the lever 62 whereby endwise movement is imparted to the two-part link 63—$63^1$ which, in turn, influences the lever 50 to overcome the power of the spring 47 with respect to the clutch 46 which is accordingly disengaged. As this occurs the yoke 60 is rendered operative through the medium of rod 64 to cause the toggle links 72 to be brought from the positions in which they are represented by full lines in Fig. 8 into aligned relations with each other to accordingly apply the brake band 65 to the shell member $46^1$ of the clutch 46. The braking of the member $46^1$ serves to prevent the rotation of the gear 22 which is rigid therewith and about which the gears 24 are revolved with the frame $20^1$ by means of the gear 23.

Assuming the gears 24 are of pitch diameters equal to gears 22 and 23 then, with frame $20^1$ rotating in the same direction as the gear 23, the gears 26 which mesh with the ring gear 27 will serve to rotate the latter at a speed equal to one-half of the ratio of the sizes of gears 26 with respect to the ring gear 27. This affords what may be termed the intermediate or second speed. If the torque on the driven shaft is greater than the power of the engine can operate through such second speed arrangement of the gears, the drum $16^1$ continues to travel rearwardly in opposition to spring 83 and also against spring 85 which is now encountered by the ring attachment 86 of the cylinder 16.

In such rearward travel of the drum, the toggle links 72 are drawn rearwardly into the positions in which they are indicated by dotted lines $72^a$ in Fig. 8 whereby the brake band 65 is rendered inoperative to accordingly release the clutch member $46^1$ which is then rotated in a direction opposite to that of the shaft 12 through the medium of the gear 22 which receives its motion through gears 24 from the gear 23 which remains coupled to the shaft 12.

Because of the gear 22 now being free to rotate upon shaft 12, the resistance occurring between the pinion 26 and the ring-gear 27 tends to make the frame $20^1$ rotate in a direction opposite to that in which the gear 23 rotates.

Such retrograde motion of the frame, however, is obviated through the offices of the rollers 43 acting in the triangular notches $41^1$ of wheel 41 to engage the same with the casing 42.

When the frame $20^1$ is thus secured against rotation, the gear 23 serves through the gears 24 to rotate the gear 22 in a direction opposite to that in which gear 23 turns. The gears 24 thereupon actuate the pinions 26 to rotate the ring gear 27 to drive the drum $16^1$ at a speed proportional to the sizes of the pinions with respect to the ring gear, that is to say—at low speed.

Such low speed is transmitted through the cylinders 16, 17 to the driven shaft 13 as for starting the vehicle or in overcoming abnormal resistances in the propulsion of the same.

After the load is started and the speed of shaft 13 has become sufficiently accelerated the torque acting through the shafts lessens and allows springs 85 and 83 to assert their power to thrust forwardly the drum $16^1$ thereby producing the gear changes in the opposite way to those explained above to correspondingly cause the gears to be progressively brought into intermediate and high speed relations with respect to each other.

The operation of the invention for automatically changing the gear connections responsive to the duty will, it is believed, be understood from the above explanation.

For controlling the gears manually for effecting gear changes or to reverse the direction of the travel of the vehicle, the operator manipulates the handle arm 37², Fig. 7.

To reverse the vehicle, the clutch 11 is first released and the handle 37² is swung to cause the arm 36² to regulate the cam 36⁴ to turn the same in the direction of arrow (Fig. 7) from the normal position in which it is illustrated. In being thus turned the cam acts through the medium of the pin 38¹ to successively advance and allow the spring 38² to retract the wedge block 38 simultaneously with the pinion 36 acting through the rack 25¹ and collar 34 to progressively shift the clutch member 31 first into neutral position and then into engagement with the clutch element 22¹ of gear 22.

While the clutch member 31 is being thus shifted, the cam advance movement of said wedge block acts through the medium of bar 50² to regulate the lever 50 for the purpose of causing the clutch 46 to be successively disengaged and engaged with respect to the shaft 12.

For controlling the gears manually to produce selective propelling speed changes, the handle 37² is regulated to turn the pinion 36 and the cam 36⁴ in a direction opposite to that indicated by the arrow in Fig. 7.

The rotary movement of such pinion acts through the rack 35¹ and the parts connected therewith to shift the clutch member 31 into engagement with the clutch element 23¹ of gear 23 to render the latter operative to drive the propeller shaft 13 with the shaft 12 at the same speed as the latter.

For transmitting a relatively slower motion to the propeller shaft 13 by the manual control, the operator turns the handle lever 37² to cause the cam 36⁴ to influence wedge block 38 whereby the bar 50² serves to cause the lever 50 to disengage the clutch 46. When the clutch 46 is thus disengaged the gear 22 is rendered idle and the gear 23 serves to rotate the pinion 26 as explained hereinbefore with respect to the automatic control. In the operation of the invention the springs 35² accommodate travel to the rack bar 35¹ for motion subsequent to the forked arm 35 being stopped by reason of the clutch member 31 being brought into engagement with the complementary clutch element 22¹ or 23¹. The members of clutch 11 remain in couple at all times except when manually disengaged by the operator for regulating the clutch member 31 for producing changes in the direction of the drive, that is to say—in passing from forward through neutral to reverse, or vice versa, or when the clutch member 31 is being shifted from its neutral position into operative relations with either of the gears 22 or 23.

From the foregoing it is obvious that the speed changes of the driven shaft are automatically controlled responsive to the required duty—or torque load—which the shaft 13 has to meet in the propelling of a vehicle or, more specifically, as the load increases the change speed gears successively reduce through high and second into low speed.

On the other hand, when the referred to load becomes less effective, as when the vehicle is under motion, the change speed gears are influenced to progressively pass from low through second into high speed.

What I claim, is,—

1. In power transmitting apparatus, the combination of a driving shaft, a driven member arranged for axial and rotary movements relative to said shaft, a system of differential-planetary gearing operatively connecting said member with said shaft, a gear wheel rotatively mounted upon the shaft and in continuous mesh with said gearing, a clutch mounted upon said shaft and operatively connected with said member and also with said gear wheel whereby axial movements of said member regulates the action of said gearing through the medium of said gear wheel.

2. In a power transmission apparatus, a driving shaft, a driven shaft, a planetary unit rotatably mounted on said driving shaft, said unit comprising driving, driven and control gears and a spider carrying planet gears coacting with said gears, manually operable means for clutching either the driving or control gears to said driving shaft, means for controlling the rotation of said control gear, means for controlling the rotation of said spider, a second means for clutching said control gear to said driving shaft, and a torque responsive coupling between the driven gear and said driven shaft, having operative connection with said second clutch and control means whereby the effective relationship of the several gear elements is changed in accordance with changes in torque on the driven shaft.

3. In a power transmission apparatus, a driving shaft, a driven shaft, a planetary unit rotatably mounted on said driving shaft, said unit comprising driving, driven and control gears and a spider carrying planet gears coacting with said gears, means for clutching either the driving or control gear to said driving shaft, a clutch device for controlling the rotation of said control gear, means for controlling the rotation of the spider, a second means for clutching said control gear to said driving shaft, and a torque responsive coupling including a slidable casing operatively associated with said driven gear and said driven shaft and having operative connection with said second clutch and control means whereby the effective relationships of the several gear elements are changed in accordance with changes in torque on the driven shaft.

4. In a power transmission apparatus, a driving shaft, a driven shaft, a bevel gear planetary unit rotatably mounted on said driving shaft, said unit comprising driving, driven and control gears and a spider carrying planet gears coacting with said gears, a manually operable means for clutching either the driving or control gear to said driving shaft, a sleeve carried by said control gear, one element of a clutch device carried by said sleeve, a breaking member operable upon the clutch element associated with the control gear, a clutch element on the driving shaft for cooperation with the clutch element associated with the control gear, and a torque responsive coupling between the driven gear and said driven shaft and having operative connection both with said last named clutch element and with said braking device whereby the effective relationship of the several gear elements is changed in accordance with changes in torque on the driven shaft.

5. In a power transmission apparatus, a driving shaft, a driven shaft, a planetary unit rotatably mounted on said driving shaft, said unit comprising driving, driven and control gears and a spider carrying planet gears coacting with said gears, an automatic clutch device for limiting rotation of said spider to one direction only, means for clutching either the driving or control gear to said driving shaft, means for controlling the rotation of said control gear, means for controlling the rotation of said spider, a second means for clutching said control gear to said driving shaft, and a torque responsive coupling between the driven gear and said driven shaft and having operative connection with said clutch and control means whereby the effective relationship of the several gear elements is changed in accordance with changes in torque on the driven shaft.

6. In a power transmission apparatus, a driving shaft, a driven shaft, a planetary unit rotatably mounted on said driving shaft, said unit comprising driving, driven and control gears and a spider carrying planet gears coacting with said gears, an automatic clutch device for limiting rotation of said spider to one direction only, manually operable means for clutching either the driving or control gear to said driving shaft, a sleeve carried by said control gear, one element of a clutch device carried by said sleeve, a breaking member operable upon the clutch element associated with the control gear, a lever engaging said brake member and movable to three operative positions, the intermediate position of which effects engagement of the brake, and the positions at the limit of swing of the lever in both directions to disengage the brake, a clutch element on the driving shaft for cooperation with the clutch element associated with the control gear, and a torque responsive coupling between the driven gear and said driven shaft and having operative connection both with said last named clutch device and with the lever of said brake member whereby the effective relationship of the several gear elements is changed in accordance with the changes in torque on the driven shaft.

7. In power transmission apparatus, the combination of a driving shaft, a rotary drum surrounding said shaft and arranged for rotary and axial movement with respect thereto, differential planetary change-speed gearing provided within the drum and adapted for operatively connecting the latter with said shaft, a driven shaft disposed in axial alignment with the driving shaft, a cylindrical member secured to the driven shaft and connected for axial movements with respect to said drum, a spring acting through the medium of the drum for regulating said gearing to effect the rotation of the driven shaft at its maximum speed, and torque responsive means acting in opposition to said spring to effect relative speed reductions of the driven shaft in inverse proportions to the load.

Signed at Seattle Washington, this 22nd day of April, 1922.

JOSEPH G. FAY.